United States Patent
Fukazawa

(10) Patent No.: US 7,877,577 B2
(45) Date of Patent: Jan. 25, 2011

(54) INFORMATION PROCESSOR AND INSTRUCTION FETCH CONTROL METHOD

(75) Inventor: Hiroshi Fukazawa, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 401 days.

(21) Appl. No.: 12/000,164

(22) Filed: Dec. 10, 2007

(65) Prior Publication Data

US 2008/0140995 A1   Jun. 12, 2008

(30) Foreign Application Priority Data

Dec. 11, 2006   (JP) .............................. 2006-333410

(51) Int. Cl.
    *G06F 9/24* (2006.01)
(52) U.S. Cl. .................................... 712/205
(58) Field of Classification Search ................. 713/187
    See application file for complete search history.

(56) References Cited

U.S. PATENT DOCUMENTS

| | | | | |
|---|---|---|---|---|
| 6,275,929 | B1 * | 8/2001 | Blum et al. ................... | 712/219 |
| 6,564,316 | B1 * | 5/2003 | Perets et al. ................. | 712/219 |
| 6,625,737 | B1 * | 9/2003 | Kissell ....................... | 713/300 |
| 7,447,916 | B2 * | 11/2008 | Liardet ....................... | 713/193 |
| 2002/0029346 | A1 * | 3/2002 | Pezeshki et al. .............. | 713/190 |
| 2002/0124178 | A1 * | 9/2002 | Kocher et al. ................ | 713/193 |
| 2003/0115478 | A1 * | 6/2003 | Feyt .......................... | 713/194 |
| 2004/0064715 | A1 * | 4/2004 | Kaminaga et al. ............. | 713/193 |
| 2004/0162993 | A1 * | 8/2004 | Teglia ........................ | 713/200 |
| 2004/0172518 | A1 * | 9/2004 | Saruwatari et al. ........... | 712/207 |
| 2005/0108507 | A1 * | 5/2005 | Chheda et al. ............... | 712/209 |
| 2005/0198480 | A1 * | 9/2005 | Ukai et al. .................. | 712/237 |

FOREIGN PATENT DOCUMENTS

JP   2003-502905   1/2003

(Continued)

OTHER PUBLICATIONS

Itoh, K et al., A Practical Countermeasure against Address-bit Differential Analysis,2003, Springer-Verlag,pp. 382-396.*

(Continued)

*Primary Examiner*—Eric Coleman
(74) *Attorney, Agent, or Firm*—McGinn IP Law Group, PLLC

(57) ABSTRACT

In implementing an encryption algorithm or the like in a computer, it is difficult to align timing at which an instruction is executed regardless of presence or absence of branch in a case of including a conditional branch instruction. In order to solve the problem, provided is an information processor (1), including: an instruction fetch unit (instruction fetch circuit 200) that fetches an instruction code to be executed to output the fetched instruction code; and an instruction decode unit (instruction decode circuit 300) that decodes the instruction code that is output from the instruction fetch unit, in which the instruction decode unit outputs, upon detection of the instruction code being a conditional branch instruction, a control signal to the instruction fetch unit so that fetch timing of the successive instruction code becomes identical with each other regardless of the presence or absence of the branch due to the branch condition.

18 Claims, 14 Drawing Sheets

FOREIGN PATENT DOCUMENTS

JP    2006-11723    1/2006

OTHER PUBLICATIONS

Superieure, E.N. etal., Reisistance against Differential Power Analysis for Elliptic Curve Cryptosystems, 1999, Springer-Verlag, pp. 292-302.*

Paul Kocher, Joshua Jaffe, and Benjamin Jun, "Differential Power Analysis", Lecture Notes in Computer Science; vol. 1666, Proceedings of the 19th Annual International Cryptology Conferences on Advances in Cryptology, Year of Publication: 1999; Cryptography Research, Inc.

* cited by examiner

INFORMATION PROCESSOR AND INSTRUCTION FETCH CONTROL METHOD

BACKGROUND OF THE INVENTION

1. Field of the Invention

The present invention relates to an instruction fetch, and more particularly, to an instruction fetch that requires security such as encryption.

2. Description of Related Art

In the recent advanced information society, individual information or information related to money is stored in a semiconductor device such as IC card of a credit card or electronic money, and thus a technology (tamper resistance) for protecting the information from being leaked or tampered becomes extremely important.

In the encryption currently used, the algorithm per se is published and the security thereof is sufficiently studied. However, the security when the algorithm is implemented as hardware or software is a know-how of each company that implements the algorithm, and sufficient study has not been conducted. For that reason, there is a method of acquiring security information by exploiting the weakness of the implementation. As an attack against the implementation, attention has been paid to a side channel attack in recent years and actively announced in various academic conferences.

The side channel attack is an attack that tries to obtain internal secret information from side channel information such as a power consumption, an electromagnetic wave, or a processing time during processing other than from an original communication channel. One of the side channel attacks is a timing attack. The timing attack is a method of deriving the secret information by paying attention to a fact that the processing time changes according to a calculation value. Also, as other attacking methods, there are a simple power analysis (SPA) that discriminates the information from the waveform of the power consumption, and an electric power analyzing method such as a differential power analysis (DPA) which discriminates a difference in the calculation contents by statistically processing a difference in the power consumption.

The use of those methods makes it possible to derive the secret information from a difference in the processing time or a difference in the power consumption, and thus a method of eliminating those differences becomes extremely important. For example, in the case of using a Chinese remainder theorem (CRT) in order to increase the processing speed by an RSA encryption, the calculation is as follows.

$$X = C \bmod Q$$

where C is a quantification of an encrypted text, and Q is a numeric value (prime number) representative of a secret key. In the case of the RSA encryption of 1024 bits, C is 1024 bits and Q is 512 bits, which are very large numeric values.

In the calculation, the calculation per se is unnecessary when the value of C is smaller than Q, and the calculation is executed to obtain a remainder of C/Q when the value of C is larger than Q. That is, the relationship of C and Q is obtained such that C>Q is satisfied when the processing time is longer whereas C<Q is satisfied when the processing time is shorter. As a result, when the calculation is executed a number of times while C is changed, the value of Q which is the secret information can be eventually found out.

This is caused not by the weakness of the algorithm per se of the RSA encryption, but by the weakness of the implementing method, which causes a difference in the processing time by the conditional branch which appears when implementing the encryption. As described above, even with the encryption that is said to be secure, there is a possibility that the secret information may leak if an inappropriate implementation is done.

The above problem can be solved by an algorithm that requires no conditional branching, which is impossible in many cases. In those cases, the weakness is eliminated by making the processing time in the case of branching equal to that in the case of no branching. For instance, an example of program when the time is simply made equal to each other is represented as follows:

If (C>Q)

{a remainder of C/Q is obtained←power consumption is larger} else {a dummy time is gained←power consumption is smaller}

As shown in the above, the difference in the power consumption is analyzed to obtain the same information as the difference in the processing time.

Accordingly, the conditions required as a countermeasure (tamper resistance) against the timing attack are considered as follows.

(1) Branching is eliminated. When branching is necessarily required, the execution time is made equal to each other regardless of branching.

(2) The power consumption is made equal to each other regardless of branching.

As a general countermeasure example in a process of obtaining the above remainder, even in the case of C<Q, a calculation of obtaining the remainder of C/Q by dummy is added, and the following conditions are satisfied. As a result, it is presumed that the calculation time and the power consumption can be made substantially equal to each other in the algorithm between C<Q and C>Q.

If (C>Q) {a remainder of C/Q is obtained} else {a remainder of C/Q is obtained, but the result is discarded (dummy calculation)}

However, in the case where the algorithm is actually implemented in a semiconductor device, the IF statement of a high level language such as C language is generally compiled in a compare instruction and a branch instruction of an assembly language. Accordingly, there occurs a shift of the execution timing due to the branch instruction or a difference in the power consumption between when branching is conducted and when branching is not conducted. That is, in the timing attack and the tamper resistance against DPA, it is important to take into consideration a case where the algorithm is implemented as software or hardware.

FIG. 9 shows an example of a circuit configuration (information processor) required for the pipeline operation. An information processor 9 shown in FIG. 9 includes a storage device 100 that stores program therein, and a central processing unit (CPU) 500 that executes program that is stored in the storage device 100. The CPU 500 includes an instruction fetch circuit 200, an instruction decode circuit 300, and an instruction processing circuit 400. In the figure, bold arrows show flows of an address value or an instruction code.

The storage device 100 stores program that is executed by the CPU 500 (plural instruction codes) therein so as to associate the respective instruction codes with addresses storing the respective instruction codes, inputs an instruction fetch address from the instruction fetch circuit 200, and outputs the instruction code to the instruction fetch circuit 200 based on the input address. Also, the storage device 100 is provided for program storage, and is not limited to a specific storage device. For example, the storage device 100 can be formed of a read only memory (ROM) not rewritable as well as a non-volatile storage device such as a rewritable flash memory, and a RAM that requires the load of program after a power supply turns on.

The instruction fetch circuit 200 determines (selects) an address (fetch address) at which an instruction code to be subsequently executed is stored, and reads the instruction code that is stored at the determined fetch address from the storage device 100. More specifically, the instruction fetch circuit 200 outputs the selected fetch address to the storage device 100, inputs the instruction code that is output from the storage device 100 based on the output address, and stores the input instruction code in a register (instruction queue 220). Hereinafter, in the specification of the present invention, the instruction code is merely called "instruction," and the fetch of the instruction code is merely called "instruction fetch."

The instruction decode circuit 300 decodes the instruction code that is output from the instruction fetch circuit 200.

The instruction processing circuit 400 executes the instruction that is decoded by the instruction decode circuit 300.

Hereinafter, the operation will be described based on the presence or absence of the branch instruction.

In the case where the instructions other than the branch instruction are continuously executed, an increment circuit 204 calculates an address of a subsequent instruction. Also, both an absolute branch signal 210 and a relative branch signal 211 are inactive. For that reason, an address select circuit 202 selects an output of the increment circuit 204. An address holding circuit 201 updates an address (fetch address) that is held by the output selected by the address select circuit 202. In this situation, the instruction select circuit 230 selects an output of the storage device 100 as a successive instruction, and stores the output in the instruction queue 220. Also, in the case where the branch instruction is detected by the instruction decode circuit 300, and no branch occurs, both of the absolute branch signal 210 and the relative branch signal 211 are inactive. For that reason, as in the case of other than the branch instruction, the address select circuit 202 selects an output of the increment circuit 204, and updates the address holding circuit 201.

Subsequently, in the case where the absolute branch instruction is detected as an unconditional branch instruction by the instruction decode circuit 300, the absolute branch signal 210 becomes active, which indicates that the absolute branch is conducted. As a result, the address select circuit 202 selects the address (absolute address) that is supplied by the branch address signal 206.

The address holding circuit 201 updates an address that is held by the address selected by the address select circuit 202. Also, the instruction select circuit 230 selects an output of a NOP instruction code generating circuit 231. The instruction queue 220 discards the stored instruction, holds the output of the NOP instruction code generating circuit 231 which is selected by the instruction select circuit 230, and outputs the held output to the instruction decode circuit 300. The instruction decode circuit 300 inputs the instruction that is held by the instruction queue 220. The instruction select circuit 230 selects the output of the NOP instruction code generating circuit 231 in the case where any one of the absolute branch signal 210 and the relative branch signal 211 is active. Accordingly, in the case where the absolute branch signal is selected, because the absolute branch instruction signal 210 becomes active, a nop instruction is inserted in an instruction sequence.

Subsequently, when the relative branch instruction is detected by the instruction decode circuit 300, and the branch occurs, the relative branch signal 211 becomes active, which indicates that the relative branch is conducted. An address adder 205 adds a value (relative address) that is supplied by the branch address signal 206 and a value of the present address signal 203 that outputs the present address that is held by the address holding circuit 201 to calculate the branched address. The address select circuit 202 selects an address that is calculated by the address adder 205. The address holding circuit 201 updates the address that is held by the address selected by the address select circuit 202. Also, the instruction select circuit 230 selects the output of the NOP instruction code generating circuit 231. The instruction queue 220 discards the stored instruction, holds the output of the NOP instruction code generating circuit 231 that is selected by the instruction select circuit 230, and outputs the held output to the instruction decode circuit 300. The instruction decode circuit 300 inputs the instruction that is held by the instruction queue 220. In this way, when the relative branch instruction is selected, the NOP instruction is inserted in the instruction sequence because the relative branch instruction signal 211 becomes active.

An example in which the branch instruction (IF statement) is described in the program that is executed by the hardware shown in FIG. 9 is shown in FIG. 10. A left side of FIG. 10 shows a case in which the branch instruction is described in C language, and a right side of FIG. 10 shows an assembly language source that is obtained by compiling the C language. In this example, for simplification, an instruction that is executed when the conditions are true and an instruction that is executed when the conditions are false are compiled in one instruction.

FIG. 11 is a flowchart showing an operation when an instruction of program shown in FIG. 10 is executed. A command of the instruction of program at the right side shown in FIG. 10 is described in a corresponding process of FIG. 11. First, cmp compares X and Y (S11). Then, jne compares X with Y, and determines the presence or absence of the branch (S12). When X=Y (not branched in S12), an instruction A that has been already subjected to the instruction fetch is executed (S13). Then, unconditional branch is conducted by jbr (S14), and the branched address is subjected to the instruction fetch (S15). On the other hand, when X≠Y (branched in S12), the instruction is fetched in order to acquire the instruction of the branched address (LABEL1) (S16), 'and an' instruction B is executed (S17). Then, a subsequent instruction after the respective processes subsequent to the conditional branch instruction have been completed is executed (S18).

FIG. 12 shows the pipeline operation in the case where program shown in FIG. 10 is executed by hardware shown in FIG. 9. A case of branching and a case of no branching are arranged in a state where execution time is justified. An upper stage of FIG. 12 shows the operation when no branch is conducted, and a lower stage of FIG. 12 shows the operation when a branch is conducted. The meanings of the respective stages of the pipeline operation are that IF denotes an instruction fetch, ID is an instruction decode, EX is the execution of a decoded instruction, MEM is a memory access, and WB is the write of the execution results in the register, respectively. The instruction fetch means that the instruction code is fetched in the instruction queue 220, and the instruction code is fetched from the storage device 100 shown in FIG. 9 or the NOP instruction code generating circuit 231 through the instruction select circuit 230.

The upper stage of FIG. 12 is a case in which no conditional branch occurs, and a subsequent instruction A is executed immediately after the conditional branch instruction jne is executed, thereafter branched to the address of the subsequent instruction by the absolute branch instruction jbr, and the subsequent instruction is executed. The operation timing chart of hardware in this situation is shown in FIG. 13. The number at the left end of FIG. 13 (210 or 201) corresponds to the number of structural element shown in FIG. 9. Also, a time T indicated by the lowest stage corresponds to the time shown in FIG. 12.

When it is assumed that the initial value of the address holding circuit 201 is 0x0000 address, cmp instruction (compare instruction) is taken in the instruction queue 220. Because this instruction is not a branch instruction, the address select circuit 202 selects a value obtained by incrementing the value of the present address signal 203 by the increment circuit 204. At time T=1, the address holding circuit 201 is updated by a value selected by the address select circuit 202. The same operation is conducted till time T=2. When the jbr instruction is detected by the instruction decode circuit 300 at time T=3, the absolute branch signal 210 becomes active at time T=4, and the following operation is conducted.

The instruction select circuit 230 selects the output of the NOP instruction code generating circuit 231 (nop instruction). Also, the instruction queue 220 discards the subsequent instruction that has been already fetched and stored, holds the output (nop instruction) that has been selected by the instruction select circuit 230, and supplies the selected output to the instruction decode circuit 300. The instruction decode circuit 300 executes the nop instruction that has been supplied from the instruction queue 230. In this situation, the address adder 205 adds a value of the present address signal 203 that has been output from the address holding circuit 201 with a value of the branch address signal 206. At T=5, the address holding circuit 201 is updated by the output value of the address adder 205 which is selected by the address select circuit 202. In the example of FIG. 13, because no branch occurs in the conditional branch instruction of time T=1, the instruction A is immediately executed at time T=2 immediately after T=1.

On the other hand, the lower stage of FIG. 12 shows a case in which the conditional branch occurs, and a phase that again fetches the branched instruction is inserted because the branch occurs in the conditional branch instruction jne, and thereafter the instruction B and the subsequent instruction are executed. The operation timing chart at that time is shown in FIG. 14. The arrangement of FIG. 14 is the same as that of FIG. 13.

In the example of the lower stage of FIG. 12, because branch occurs in the conditional branch instruction of time T=1, the absolute branch signal becomes active at T=2 as in the case where branch occurs in the above-mentioned jbr instruction. In the instruction queue 220, the instruction A that has been already fetched and stored is discarded and changed to the nop instruction. In this situation, the address adder 205 adds a value of the present address signal 203 that has been output from the address holding circuit 201 and a value of the branch address signal 206 together. At time T=3, the address holding circuit 201 is updated by the output value of the address adder 205 which is selected by the address select circuit 202, and the instruction B of the branched address is fetched.

Also, JP 2003-502905 A discloses an example using a part of the encryption calculation. In the originally required calculation, when a value of the bit included in a key is "1," the result of the Montgomery multiplication is stored in a portion to be originally stored. When the value of the bit included in the key is "0," nothing is conducted, and therefore a time difference in the calculation occurs.

Under the above circumstances, in JP 2003-502905 A, when the value of bits included in the key is "1," the result of the Montgomery multiplication is stored in a portion to be originally stored, and if not, dummy calculation that the result of the Montgomery multiplication is stored (discarded) in a temporal region is added so that the time difference between a case where the value of bits is "1" and a case where the value of bits is "0" is tried to be eliminated. Further, JP 2006-11723 A discloses a technology related to a method of controlling the branch for subjecting the instruction to pipeline processing.

However, the prior art suffers from a problem on processing and a problem on the circuit as described below. As is apparent from FIGS. 12, 13, and 14, in the prior art, when no branch occurs in the branch instruction of time T=1, the subsequent instruction is executed at time T=5, and when branch occurs, the subsequent instruction is executed at time T=4. As described above, timing at which the subsequent instruction is executed is different depending on the presence or absence of branch, and there occurs a problem on the processing in that there is the possibility that the operation is analyzed from the timing difference.

Also, as is apparent from FIG. 12, after the conditional branch instruction jne is conducted, the instructions that are executed simultaneously are different between a case where branch is conducted and a case where no branch is conducted. Therefore, the operating circuits are also different from each other. For that reason, there occurs the problem on the circuit in that the power consumption is different between those cases.

There is a possibility that the secret information is decrypted by conducting the side channel attack by using the side channel information such as the shift of timing or the difference in the power consumption. In JP 2006-11723 A, the difference in timing and the difference in the power consumption are not considered because the optimization and high speed of the pipeline operation are intended. On the other hand, in JP 2003-502905 A, the dummy calculation or the dummy memory storage is conducted for the purpose of eliminating the difference in the timing and power consumption. However, the conditional statement (IF statement) required in this situation is compiled into the conditional branch instruction by a compiler, and the occurrence of a difference between the case where branch is conducted and the case where no branch is conducted is not considered.

As described above, in implementing encryption algorithm or the like in a computer, it is difficult to align the timing at which the instruction is executed regardless of the presence or absence of branch in the case of including the conditional branch instruction.

SUMMARY

In one embodiment, an information processor includes: an instruction fetch unit that fetches an instruction code to be executed to output the fetched instruction code; and an instruction decode unit that decodes the instruction code that is output from the instruction fetch unit, in which the instruction decode unit outputs, upon detection of the instruction code being a conditional branch instruction, a control signal to the instruction fetch unit so that fetch timing of the successive instruction code becomes identical with each other regardless of the presence or absence of the branch due to the branch condition. As described above, the timing at which the instruction to be executed is fetched is aligned, thereby enabling the timing at which the instruction is executed to be aligned regardless of the presence or absence of branch due to the conditional branch instruction. This enables to make the processing time identical.

In another embodiment, an instruction fetch control method includes, in the case of fetching an instruction code, decoding the fetched instruction code, and detecting the conditional branch instruction, fetching of the instruction code is additionally instructed so as to align the timing at which the instruction is executed regardless of the presence or absence of branch, the instruction code is fetched based on the instruction, the added and fetched instruction code is decoded, and the decoded instruction code is executed. In this way, the instruction fetch is instructed so as to align the timing at which the instruction is executed, thereby making it possible to align the processing timing of the instruction regardless of the presence or absence of the branch due to the conditional branch instruction. For example, in the case where the timing at which the instruction fetch is implemented is increased in the circuit configuration so as to align the timing at which the instruction is implemented, there is assumed a case of executing a program into which an unconditionally branched instruction is inserted in advance so as to align the timing at which the instruction is implemented.

According to the embodiments, it is possible to align the timing at which the instruction is executed regardless of the presence or absence of the branch in the case of including the conditional branch instruction in implementing an encryption algorithm or the like in a computer.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Next, embodiments of the present invention will be described with reference to the accompanying drawings. The structural elements and corresponding parts having the same structure or function in the respective drawings are denoted by identical references, and their description will be omitted.

The respective embodiments of the present invention are to solve a difference in the instruction execution timing in the pipeline operation, and a difference in the power consumption due to the difference in the instruction execution timing, which are the above-mentioned problems with the related art. In order to solve the difference in the execution timing in the pipeline operation, the operation of refetching the instruction code is conducted, which occurs when branch is conducted, even in the case where no branch is conducted, to thereby align the execution timing of the instruction. That is, the instruction decode circuit generates a signal that again refetches the instruction code in the branch instruction and instructions other than the branch instruction, and selects which of a branched value and a value not branched is used to update the address holding circuit. As a result, the instruction execution timing is aligned. Also, in order to solve the difference in the power consumption, a circuit that is not originally required for the operation is operated to make the circuit that operates at the same time equal to each other, thereby making the power consumption equal to each other. That is, all of the circuits for updating the address update are operated, and only the necessary circuits are selected from the results by the select circuit. Also, the above technologies are used together, thereby solving the problems on the differences in the timing and the power consumption.

First Embodiment

In the first embodiment of the present invention, a description will be given of an aspect of an information processor that aligns the timing at which the instruction code to be subsequently executed, and also aligns the power consumption in the case of detecting the conditional branch instruction. More specifically, a description will be given of a case where in order to align the timing at which the instruction subsequent to the conditional branch instruction is fetched, the instruction is controlled to be fetched regardless of the presence or absence of the branch, and the address that is a candidate of the instruction fetch is calculated every time.

Figure 1:
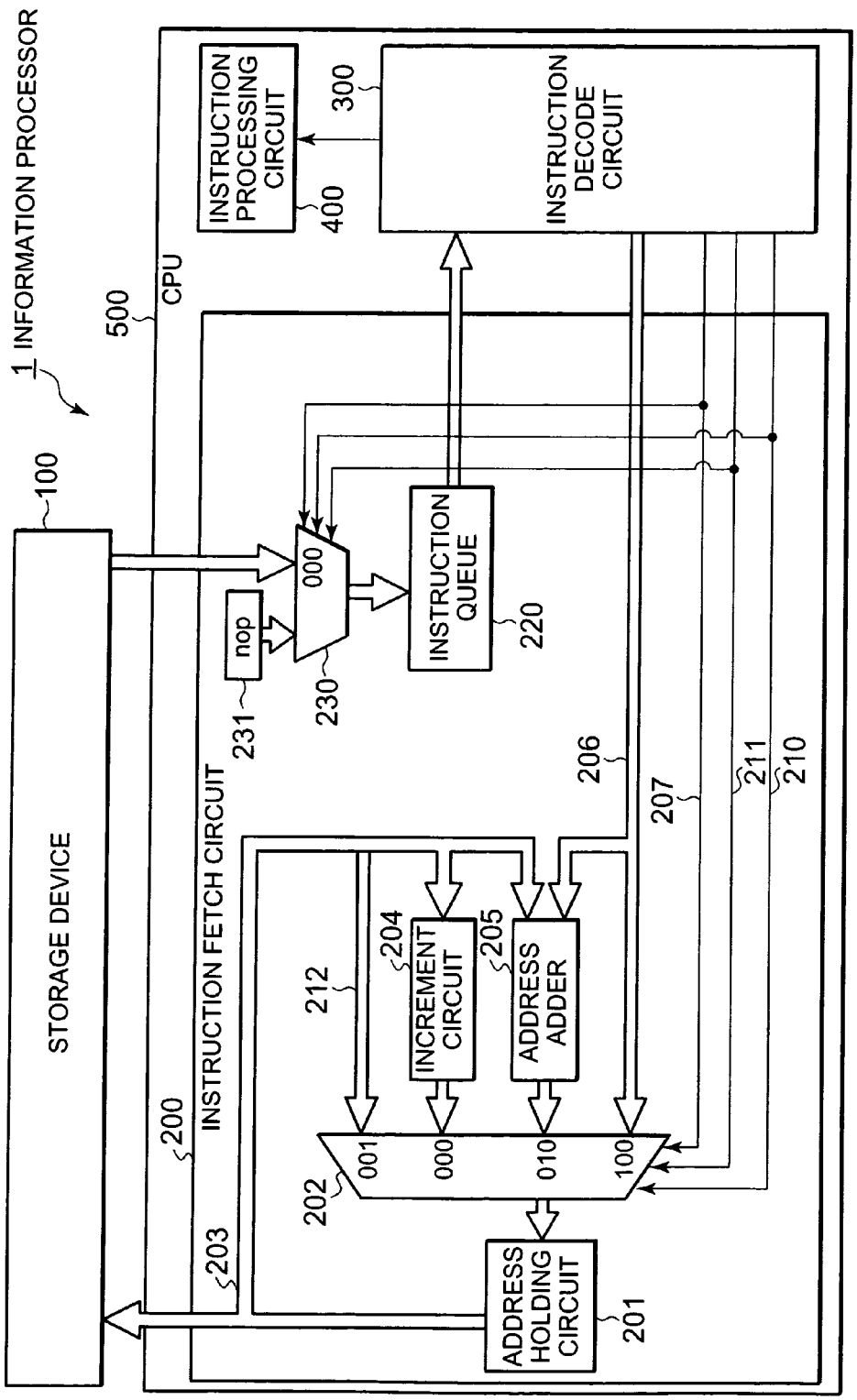
FIG. 1 is a block diagram showing an example of an information processor according to a first embodiment of the present invention.
Figure 9:
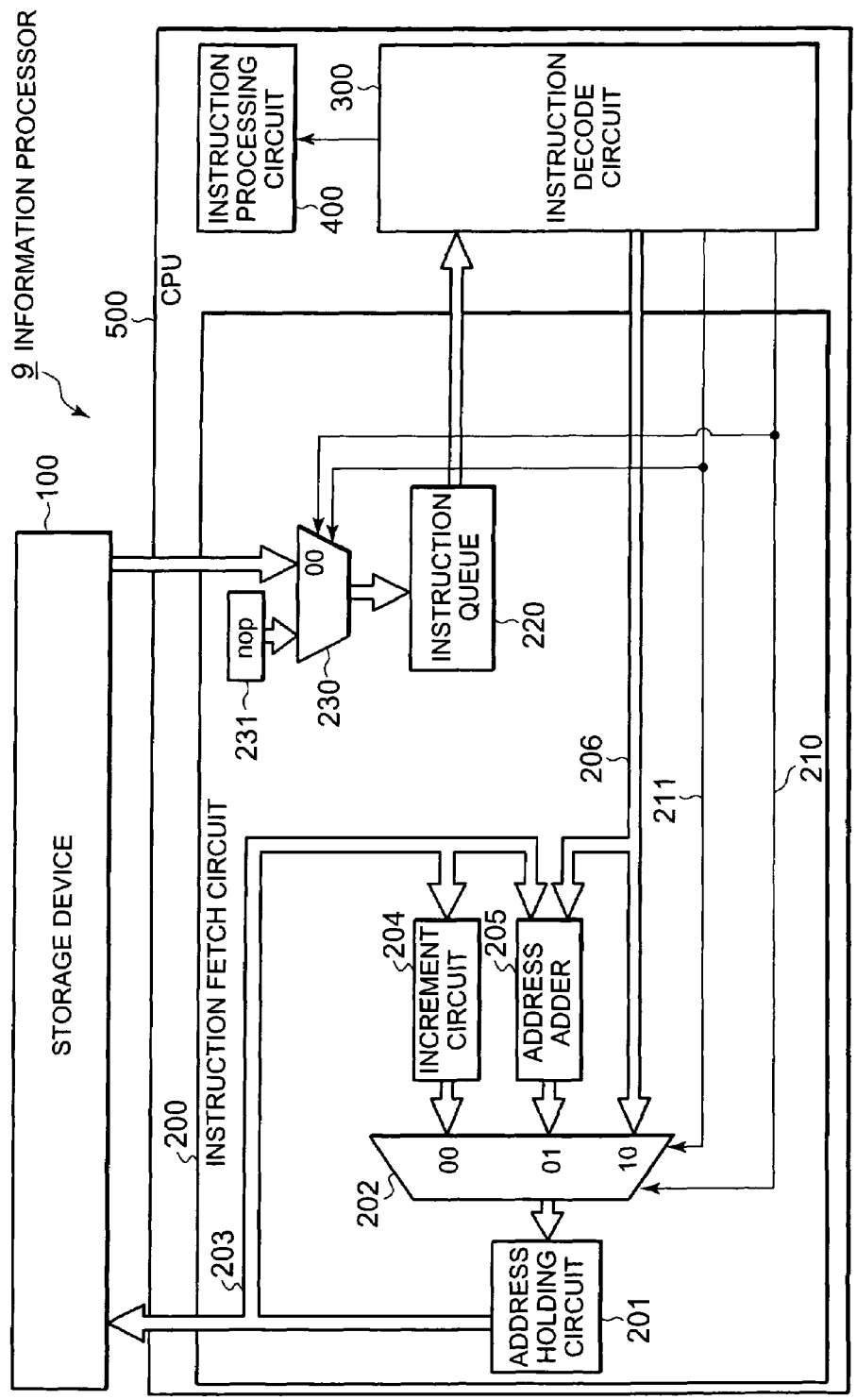
FIG. 9 is a diagram showing an example of a conventional information processor.
Figure 10:
FIG. 10 is a diagram showing an example in which program of a branch instruction is described in a C language and an assembly language.
Figure 11:
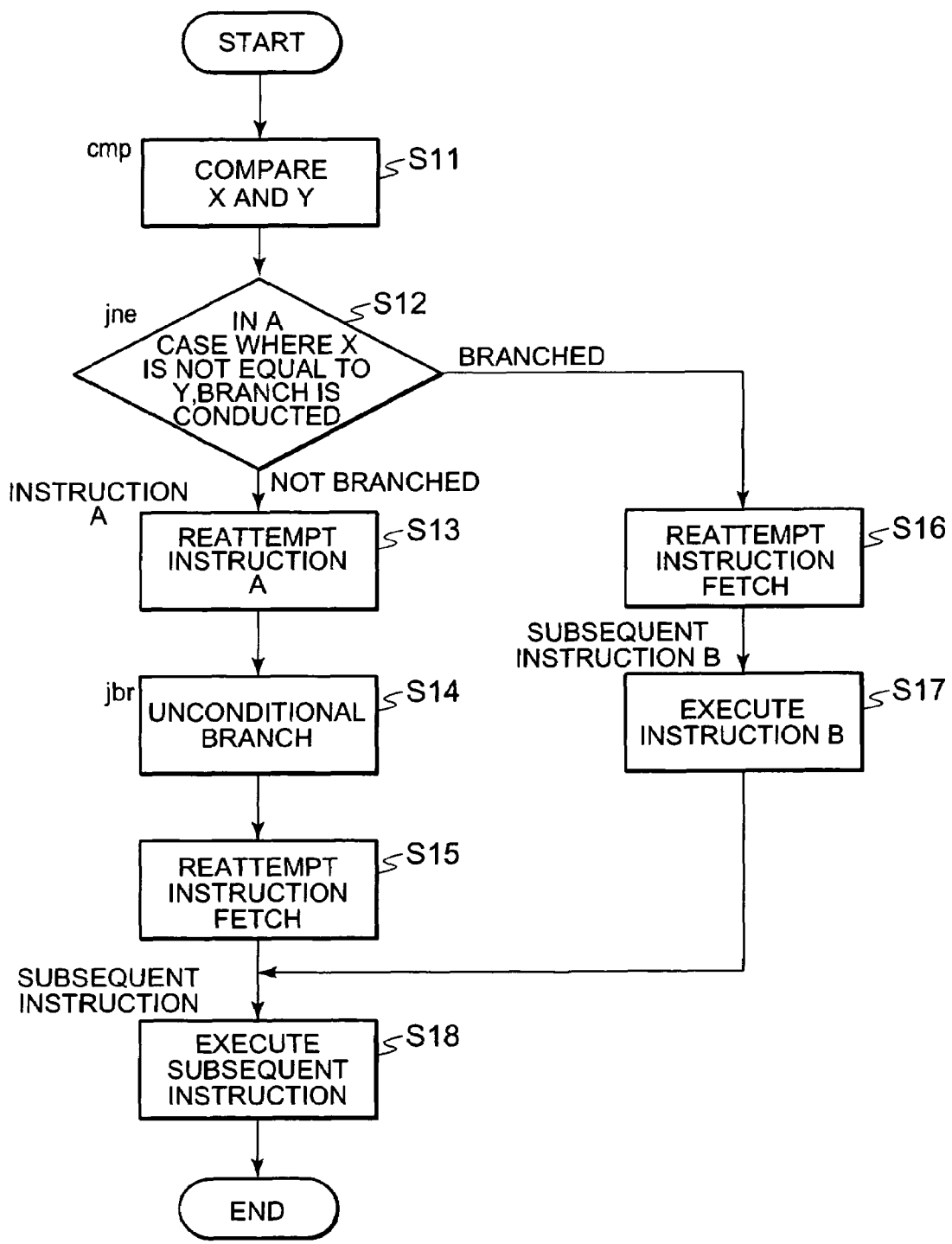
FIG. 11 is a flowchart showing an operation when the instruction of program shown in FIG. 10 is executed.

FIG. 1 is a block diagram showing an example of an information processor according to a first embodiment of the present invention. Referring to FIG. 1, an information processor 1 includes a storage device 100 that stores program therein, and a central processing unit (CPU) 500 that executes the program that has been stored in the storage device 100. The CPU 500 includes an instruction fetch circuit (instruction fetch unit) 200, an instruction decode circuit (instruction decode unit) 300, and an instruction processing circuit (instruction processing unit) 400. A feedback signal 212 that feeds back a value of a present address holding circuit 201, and an instruction refetch signal 207 that instructs (requests) to again fetch the same instruction code are added to the conventional circuit structure shown in FIG. 9. The structural elements denoted by the same references as those of FIG. 9 are identical with each other, and therefore their description will be omitted.

The feedback signal 212 is a signal for again writing a value held in the address holding circuit (address holding unit) 201 in the address holding circuit 201. The feedback signal 212 is input to the address select circuit (address select unit) 202. The address that is fed back by the feedback signal 212 is an instruction fetch address that fetches the previous instruction code, and therefore the address is also called "previous fetch address." The instruction refetch signal 207 is input to an address select circuit 202 and an instruction select circuit (instruction select unit) 230. When the instruction refetch signal 207 becomes active, the address select circuit 202 selects the address value of the feedback signal 212 as an output. Also, the instruction select circuit 230 selects a nop instruction as an output when the instruction refetch signal 207 becomes active.

In the related art, the operation of again writing the address that is currently held by the address holding circuit 201 is not conducted. However, in this embodiment, the above confirmation is applied in order to align the timing of processing, and reduce the difference in the power consumption. Also, both of an address increment circuit 204 and an address adder circuit 205 always conduct the dummy operation (operation results are ignored) in both of the normal instruction fetch and the branch instruction fetch. That is, the increment circuit 204 and the address adder circuit 205 can be so configured as to operate only when the operation is necessary (only when an absolute branch signal 210 or a relative branch signal 211 is active). However, in this embodiment, the increment circuit 204 and the address adder circuit 205 always operate. Accordingly, regardless of the presence of absence of the branch, the address select circuit 202 inputs the address (previous fetch address) that has been held in the address holding circuit 201 from the feedback signal 212, the subsequent address of an instruction that is executed subsequently after the calculation of the increment circuit 204, a relative address that is relatively branched which has been calculated by the address adder 205, and an absolute address that is absolutely branched from the branch address signal 206.

Figure 2:
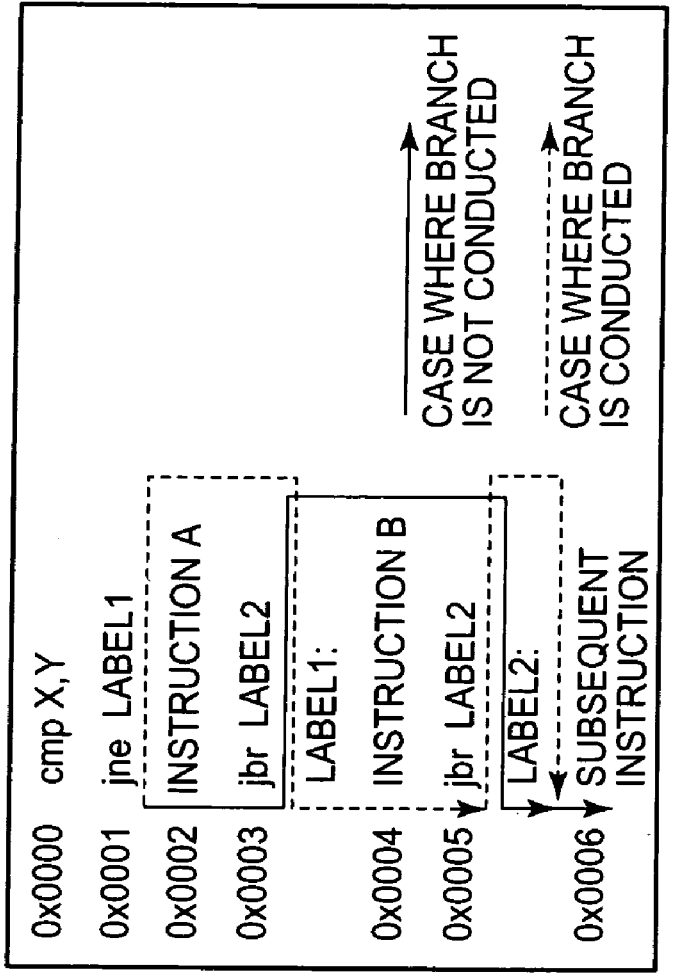
FIG. 2 is a diagram showing an example in which program of a branch instruction according to this embodiment is described in a C language and an assembly language.

FIG. 2 shows an example in which the program of the branch instruction according to this embodiment is described in the C language and the assembly language. FIG. 2 shows an example in which the branch instruction is inserted so as to eliminate the difference in the processing time in the program in order to solve the problem with the processing. The insertion of the branch instruction can be designated by a person with the use of program edition software that operates on a computer such as a personal computer. However, the following procedure can be automatically conducted by allowing the computer to execute the compiler that compiles a high level language such as the C language.

In the case where processing A and processing B are converted into one instruction of an instruction A and an instruction B whose execution time is equal to each other, when the compiler processes the IF to ELSE statements, the instruction A is generated from the processing A which is executed when the condition is true, and an unconditional branch instruction to a subsequent statement of the IF to ELSE statements is generated. The instruction B is generated from the processing B in the case where the condition is false. However, in this situation, in the related art, branch is unnecessary because a statement subsequent to the IF to ELSE statements come after the instruction B. However, in order to eliminate the difference in the branch between the case where the condition is true and the case where the condition is false, in this embodiment, branch is intentionally conducted in a statement subsequent to the IF to ELSE statements after the unconditional branch instruction jbr LABEL2 is inserted immediately after the instruction B is generated from the processing B, and the instruction fetch is reattempted.

As described above, the branch instruction is inserted, and the circuit shown in FIG. 1 is used, thereby making it possible to eliminate the difference in the processing time due to the blanch and also eliminate the difference in the power consumption. Subsequently, the operation of the information processor according to this embodiment will be described.

Figure 3:
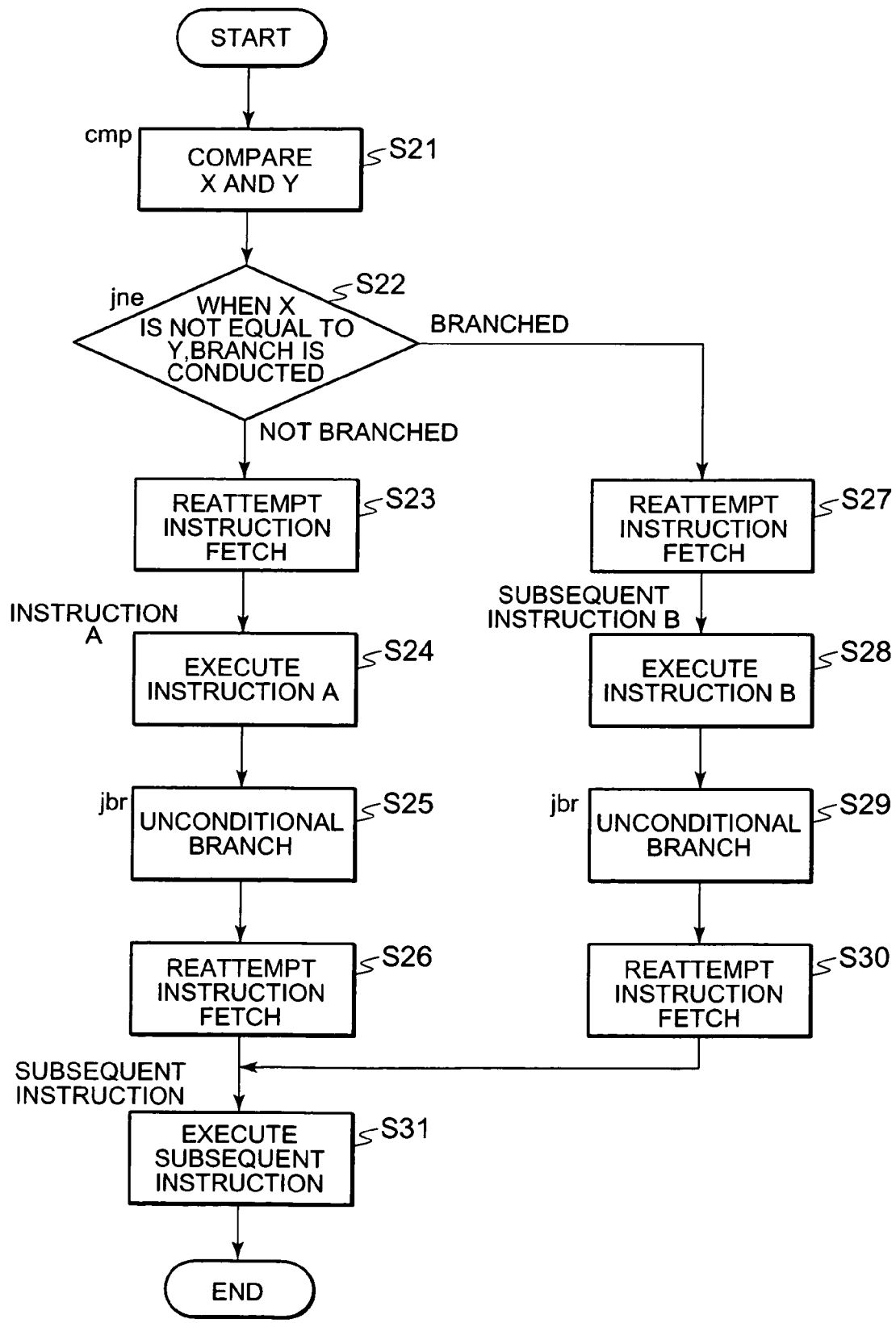
FIG. 3 is a flowchart showing an operation when the instruction of program shown in FIG. 2 is executed.

FIG. 3 is a flowchart showing the operation when the instruction of the program (software) shown in FIG. 2 is executed. The command of the instruction of program at the right side of FIG. 2 is described in a corresponding process in FIG. 3. First, cmp compares X with Y (S21). Then, jne compares X with Y to determine the presence or absence of the branch (S22). When X=Y (not branched in S22), the refetch of the instruction that has been already fetched (instruction A) is implemented (S23), and the instruction A is executed (S24). Then, the unconditional branch is conducted by jbr (S25), and the branched address is subjected to the instruction fetch (S26). On the other hand, when X≠Y (branched in S22), in order to acquire the instruction of the branched address (LABEL1), the instruction is fetched (S27), and the instruction B is executed (S28). The unconditional branch is conducted by jbr (S29), and the branched address is subjected to the instruction fetch (S30). After the respective processing subsequent to the conditional branch instruction has been completed, the subsequent next instruction is executed (S31).

As described above, the instruction refetch signal 207 shown in FIG. 1 and the feedback signal are inserted into the information processor 1 with the result that in the case where branch is conducted or not, the instruction fetch is reattempted. Also, the unconditional branch instruction is executed after the execution of the instruction B when branch is conducted, whereby the instruction fetch is reattempted equally in the case where the IF statement does not occur.

Figure 4:
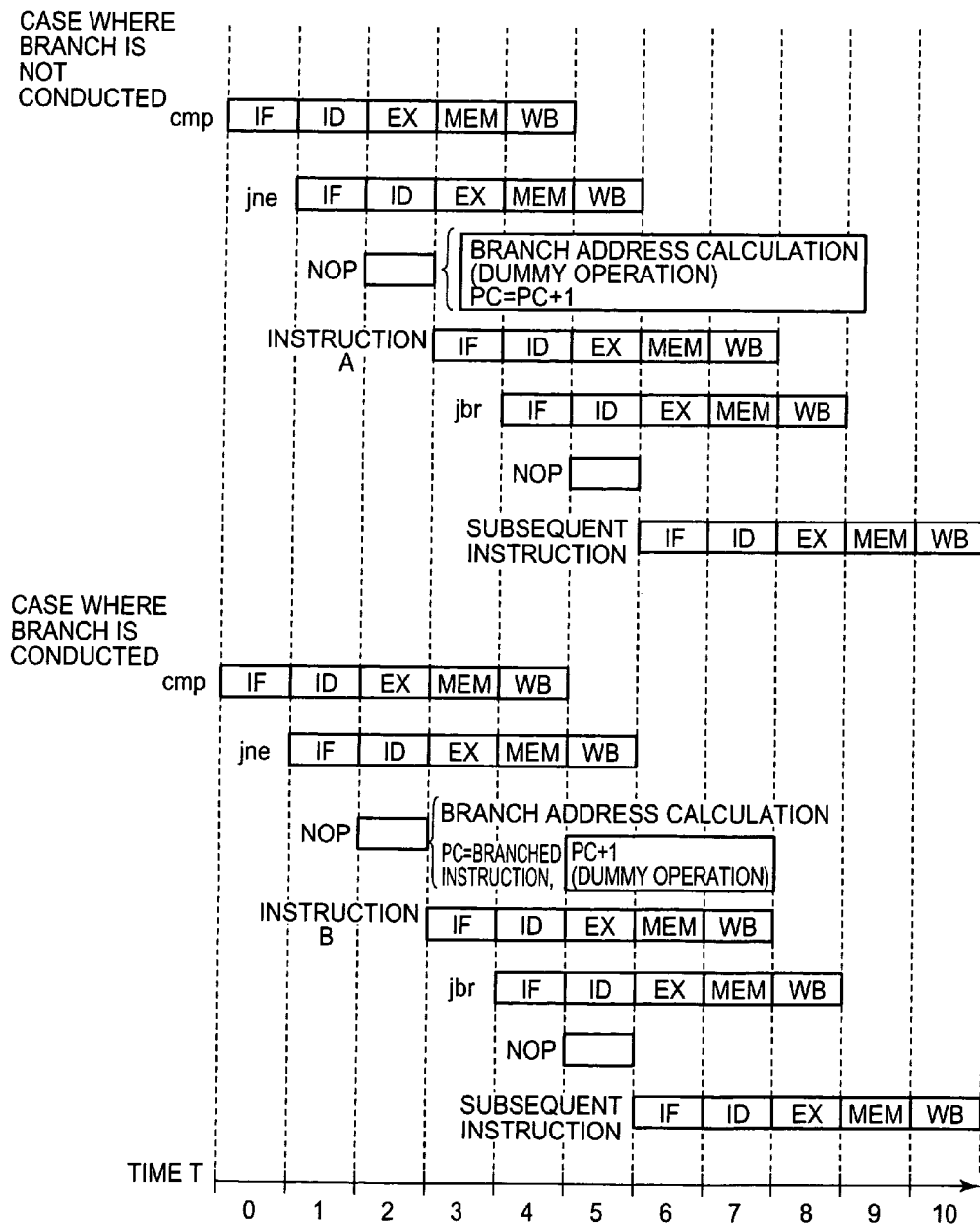
FIG. 4 is a diagram showing an aspect of the pipeline operation when the program shown in FIG. 2 is executed by hardware shown in FIG. 1.
Figure 12:
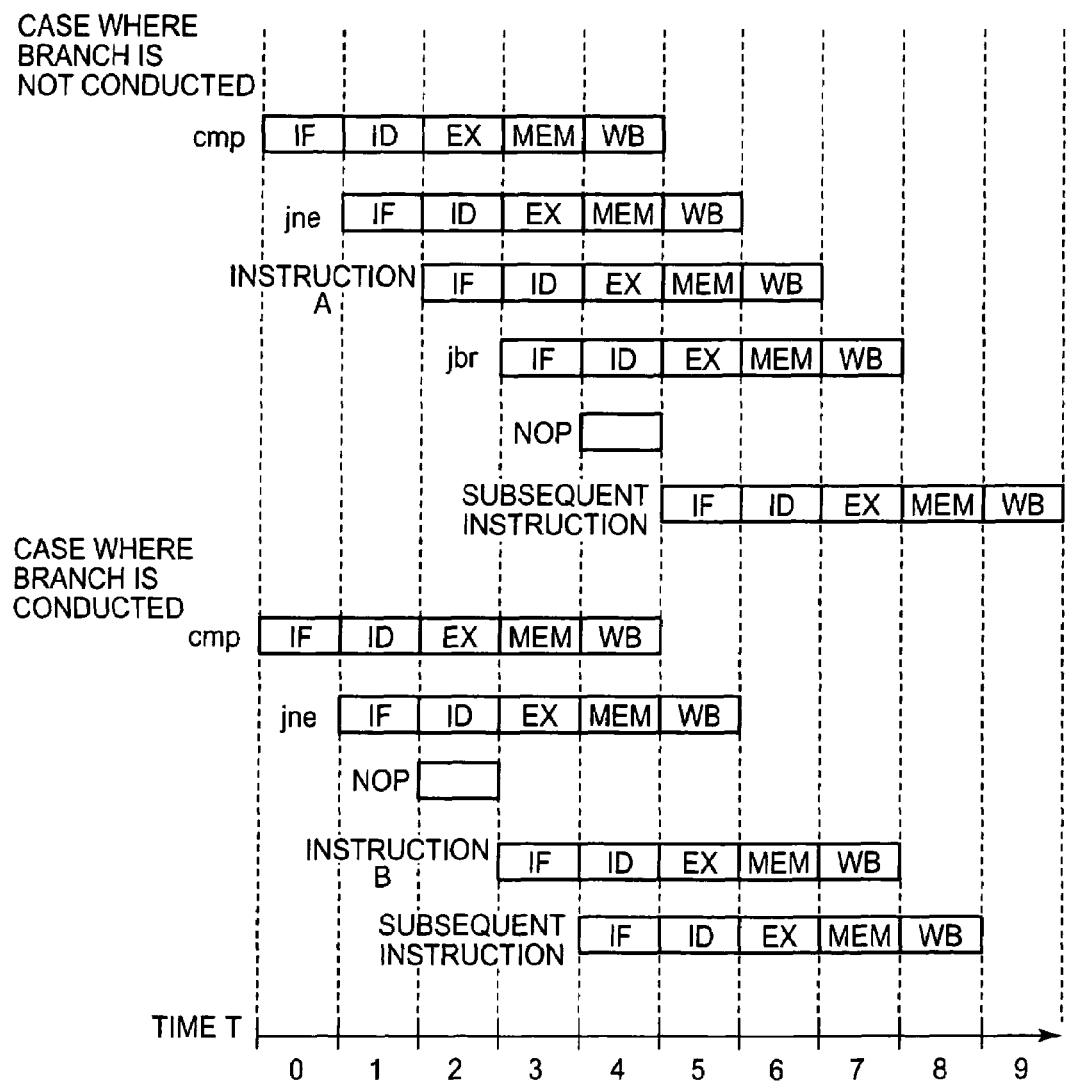
FIG. 12 is a diagram showing the appearance of the operation of the pipeline when the program shown in FIG. 10 is executed by hardware shown in FIG. 9.

FIG. 4 is a diagram showing the appearance of the pipeline operation in the case where the program shown in FIG. 2 is executed by the hardware shown in FIG. 1. In the diagram, a case where branch is conducted and a case where no branch is conducted are arranged in a state where the execution time is aligned. The upper stage of FIG. 4 shows a case where the condition has not been branched, and the instruction fetch (IF) occurs after the execution of the branch instruction jne. The operation is not conducted in the related art shown in FIG. 12. More specifically, the instruction decode circuit 300 detects the branch instruction, and the instruction refetch signal 207 is rendered active in the case where no branch occurs. In the instruction fetch circuit 200, the address select circuit 202 selects the address that goes through the feedback signal 212 which is connected to the present address signal 203 that is an output of the address holding circuit 201. The address holding circuit 201 is supplied with the value of the feedback signal 212 that is selected by the address select circuit 202, and again holds the same address. The instruction A has been already taken in the instruction queue 220, but the instruction A is executed after the same instruction A has been refetched. Thereafter, the condition is branched to the address of the subsequent instruction by the jbr instruction to execute the subsequent instruction.

Figure 5:
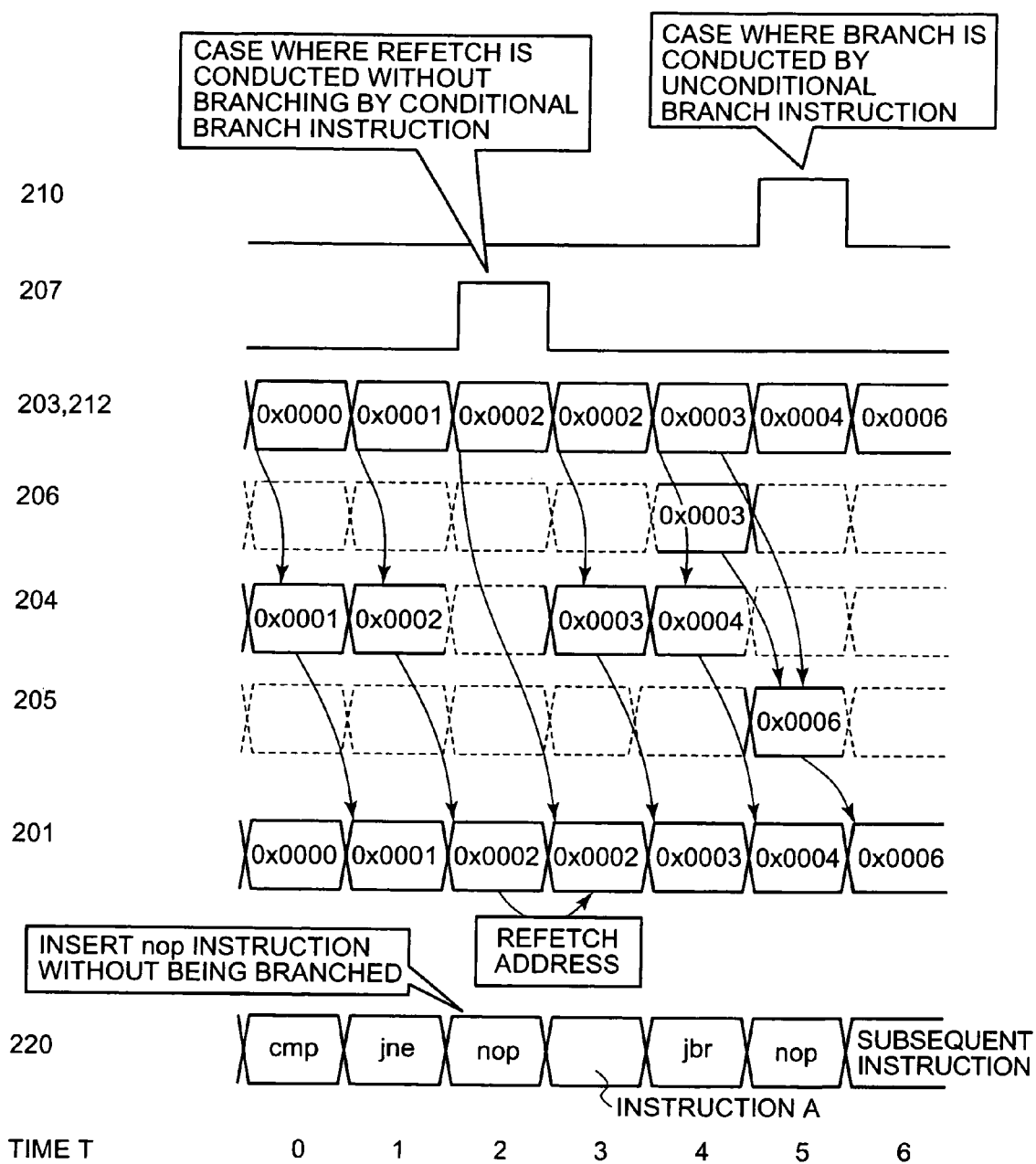
FIG. 5 is a timing chart when the program of FIG. 2 (not branched in the conditional branch instruction) is operated by hardware shown in FIG. 1.
Figure 13:
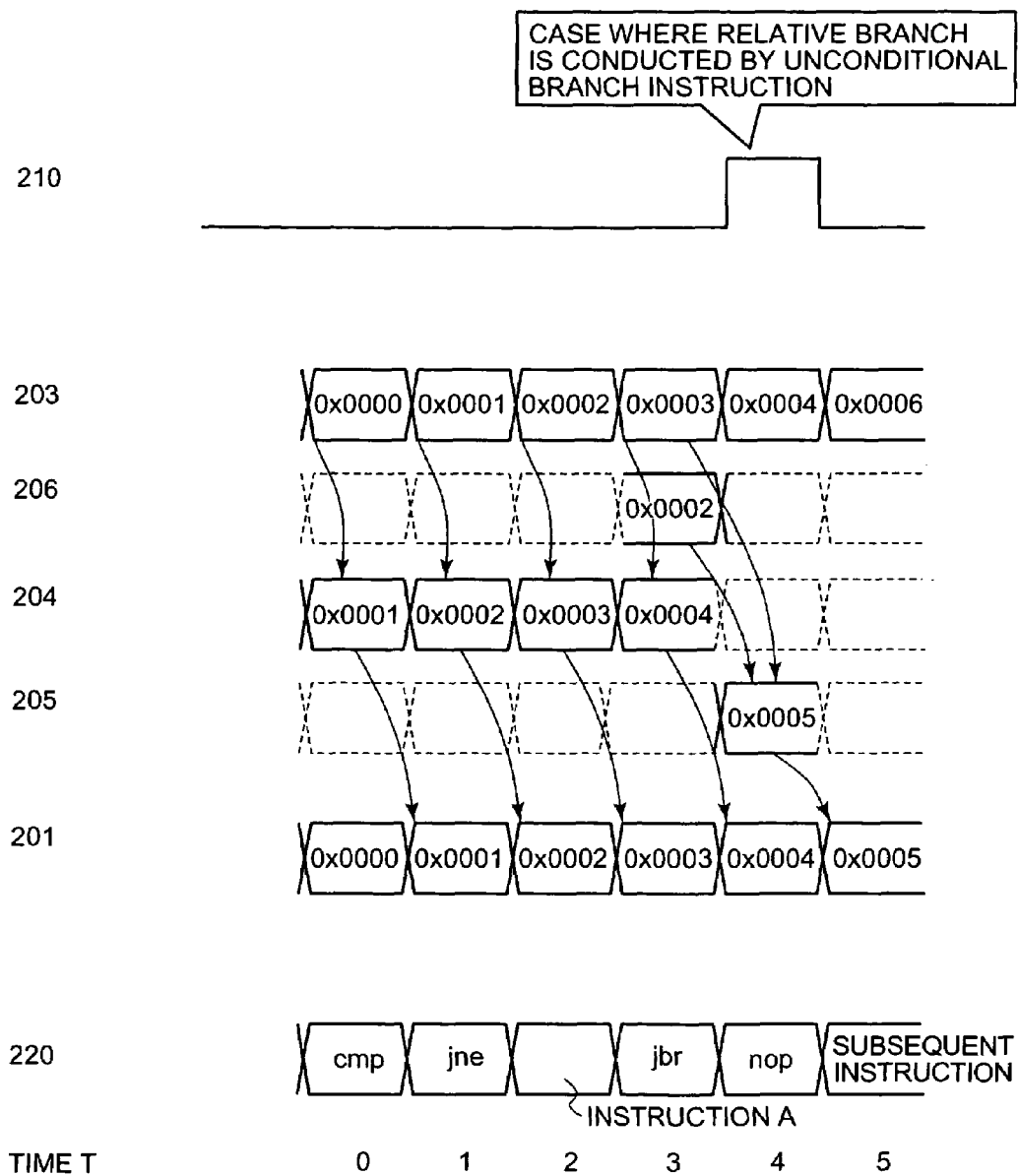
FIG. 13 is a timing chart when the program shown in FIG. 10 (not branched in the conditional branch instruction) is operated by the hardware shown in FIG. 9.
Figure 14:
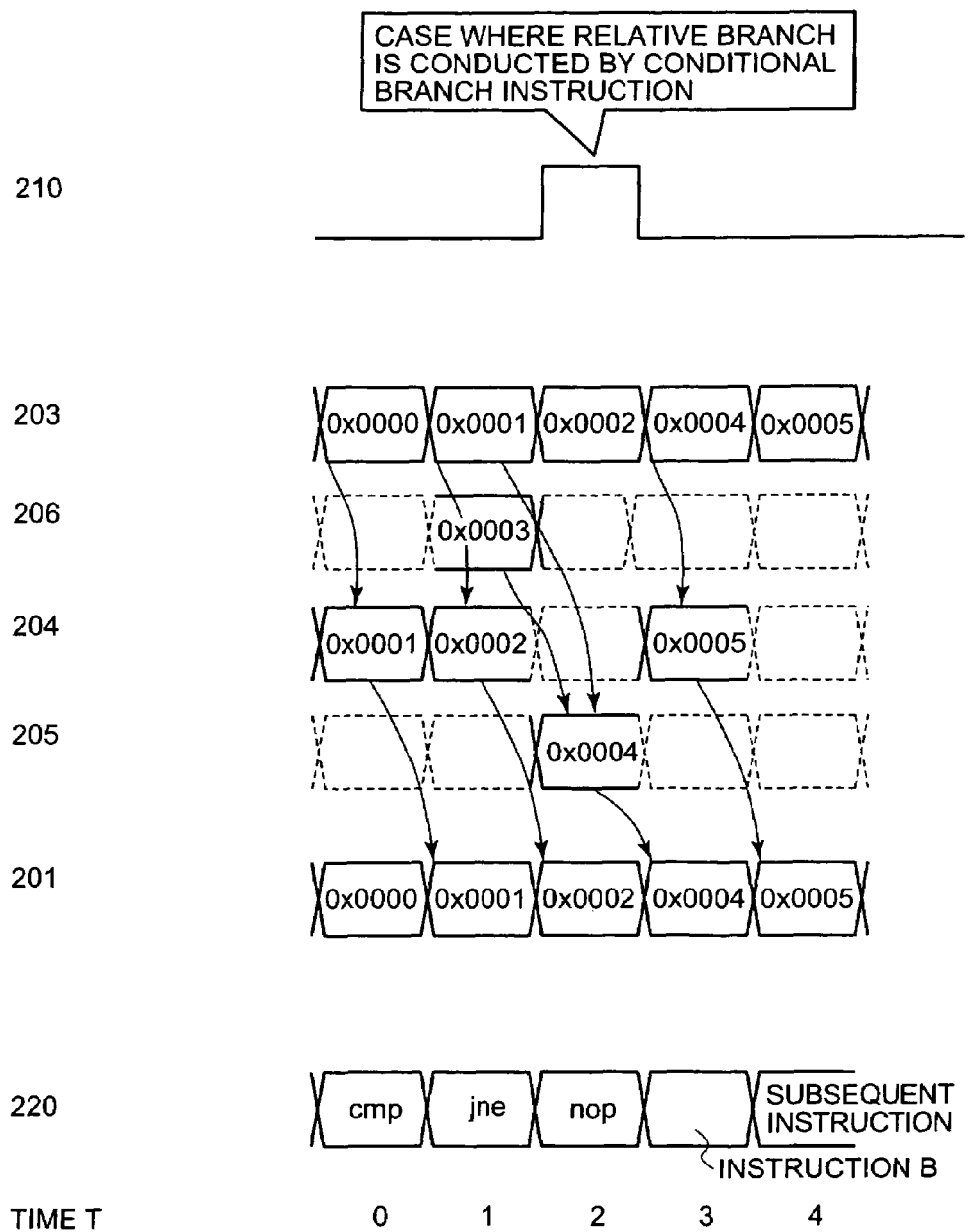
FIG. 14 is a timing chart when the program shown in FIG. 10 (branched in the conditional branch instruction) is operated by the hardware shown in FIG. 9.

The operation timing chart of the hardware in this situation is shown in FIG. 5. The arrangement of FIG. 5 is identical with that in FIG. 13. Because FIG. 5 shows an example in which no branch occurs, no branch occurs even if the conditional branch instruction jne is detected at time T=1. However, in this embodiment, upon detecting the conditional branch instruction, the instruction decode unit 300 renders the instruction refetch signal 207 active. The instruction select circuit 230 selects the output of the NOP instruction code generating circuit 231. The instruction queue 220 discards the subsequent instruction that has been already fetched and stored, selects the nop instruction that has been selected by the instruction select circuit 230, and supplies the selected nop instruction to the instruction decode circuit 300. At time T=2, the nop instruction is executed. Accordingly, the address select circuit 202 selects the address that goes through the feedback signal 212. The address holding circuit 201 is supplied with the value of the feedback signal 212 that has been selected by the address select circuit 202, and again holds the same address (previous fetch address).

As a result, at time T=3, the instruction fetch circuit 200 again fetches the instruction A. That is, in the case where no branch is conducted in the branch instruction jne, the information processor 1 executes the instruction A that has been already fetched in the related art. On the contrary, in this embodiment, the instruction queue 220 replaces the instruction A with the nop instruction, and executes the nop instruction. Thereafter, the instruction A is again fetched. As a result, the number of cycles is aligned between the case where branch is conducted in the branch instruction jne and the case where no branch is conducted. Also, the condition is branched to the address 0x0006 into which the subsequent instruction is stored by the unconditional branch instruction jbr that is executed subsequent to the instruction A. In this way, the instruction fetch circuit 200 fetches the instruction A at the same timing as the timing at which the instruction B is fetched in the case where no branch is conducted based on an instruction (the instruction refetch signal 207 is rendered active) from the instruction decode unit 300.

On the other hand, the lower stage of FIG. 4 shows that in the case where the condition is branched, a phase that refetches the branched instruction (the instruction B in this case) is inserted because the branch occurs in the branch instruction jne. Thereafter the instruction B is executed, the condition is branched to the subsequent instruction by the jbr instruction that has been inserted manually or by a compiler, and then the subsequent instruction is executed.

Figure 6:
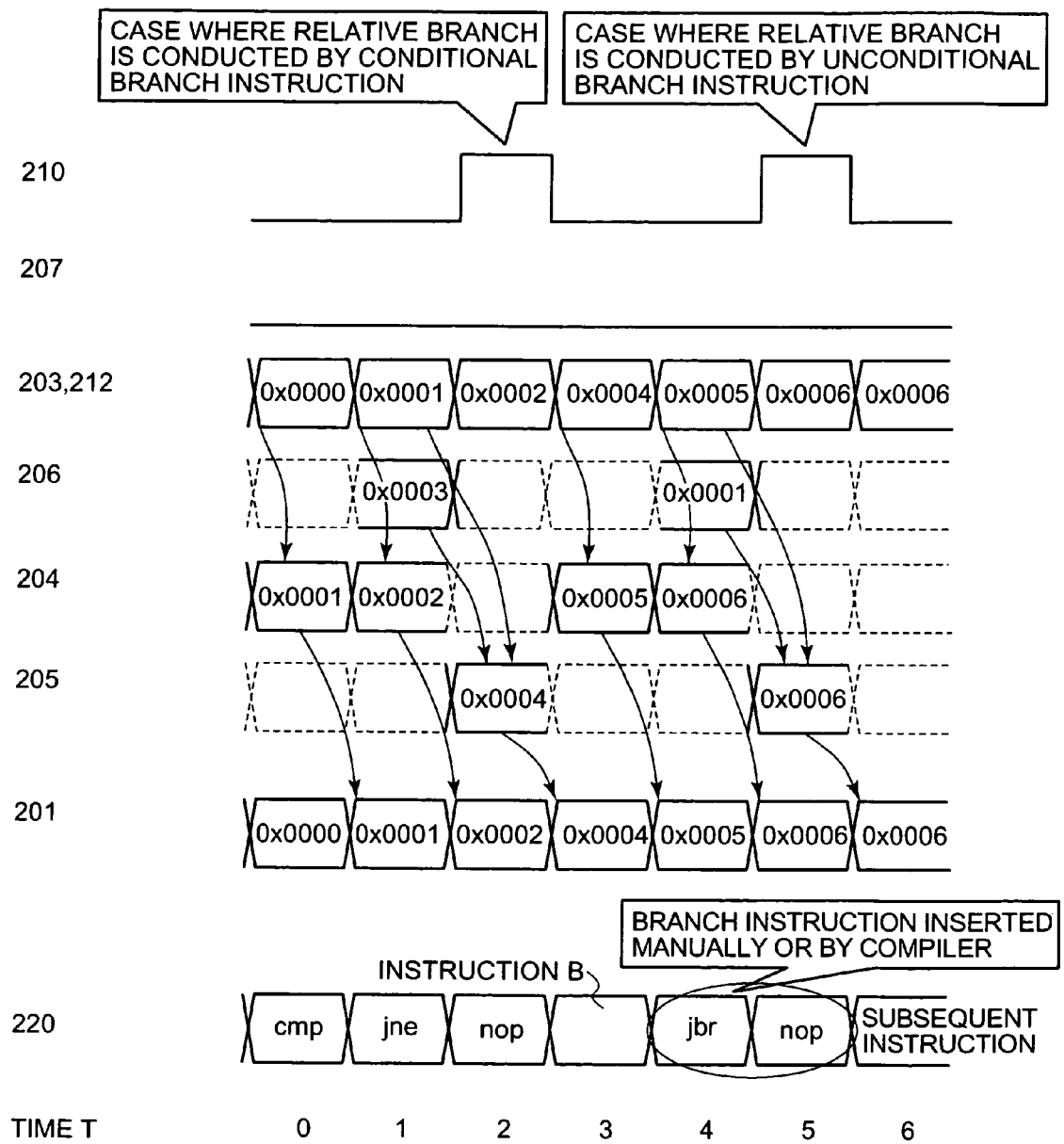
FIG. 6 is a timing chart when the program of FIG. 2 (branched in the conditional branch instruction) is operated by hardware shown in FIG. 1.

The operation timing chart of the hardware in this situation will be described in FIG. 6. The arrangement of FIG. 6 is also identical with that of FIG. 13. FIG. 6 shows an example in which branch occurs, and therefore the normal branch operation is conducted when the conditional branch instruction jne is detected at time T=1. That is, the instruction decode unit 300 does not render the instruction refetch signal 207 active, but renders the absolute branch signal 210 active. The instruction select circuit 230 selects the output (nop instruction) of the NOP instruction code generating circuit 231. The instruction queue 220 discards the subsequent instruction that has been already fetched and stored, selects the nop instruction that has been selected by the instruction select circuit 230, and supplies the selected nop instruction to the instruction decode circuit 300. The instruction decode unit 300 executes the nop instruction. The address select circuit 202 selects a value obtained by adding the value of the branch address signal 206 and the value of the present address signal 203 that has been output from the address holding circuit 201 by the address adder 205. The address holding circuit 201 is updated by the value selected by the address select circuit 202 (the output value of the address adder 205). As a result, the instruction B is fetched at time T=3.

Also, the condition is branched to the address 0x0006 into which the subsequent instruction is stored by the unconditional branch instruction jbr that has been inserted after the instruction B. The operation is the same as that in FIG. 5, and therefore its description will be omitted. In this way, the instruction decode circuit 300 instructs the branch of the condition to the address of the successive same instruction when the processing at the time of branching the condition is completed, so that the timing at which the successive same instruction is executed is identical with each other when the respective processing in the case where the condition is branched by the conditional branch instruction and in the case where the condition is not branched is completed. Also, the instruction fetch circuit 200 conducts the unconditional branch based on the instruction from the instruction decode circuit 300 (the absolute branch signal 211 is rendered active), to thereby fetch the successive instruction at the same timing as that in the case where branch is not conducted.

As is apparent from the pipeline operation of FIG. 4, the instructions that are always executed at the same time become substantially equal to each other in any one of the case where branch is conducted and the case where branch is not conducted (the difference is the instruction A and the instruction B), and a time at which the instruction reaches the subsequent instruction is also equal to each other. Also, because the instruction to be executed is substantially equal to each other, it is presumed that the circuits that operate are also equal to each other and the power consumption is also substantially equal to each other. That is, the differences are a difference in the operating circuit between the instruction A and the instruction B or the number of processing clocks, which does not depend on the branch or no branch.

As described above, in this embodiment, as described above, the timing at which the instruction fetch is conducted is controlled, thereby making the timing at which the instruction is executed identical with each other by fetching the instruction regardless of the presence or absence of the conditional branch instruction. For example, the instruction fetch is instructed based on the timing branched in the respective processing which is implemented subsequently to the conditional branch instruction to align the timing at which the instruction is executed. Also, plural candidates of the address that is subjected to the instruction fetch is calculated every time, thereby making it possible to make the power consumption equal to each other. More specifically, all of the operation of the circuit related to the address select circuit 202 is operated, and the address select circuit 202 selects the required address value and discards the unnecessary operation result. As a result, it is possible to suppress the difference in the power consumption based on the difference in the operation contents.

Second Embodiment

In a second embodiment, a description will be given of an aspect of an information processor that controls a period during which the instruction refetch function that renders the instruction refetch signal 207 active is made effective and a period during which the instruction refetch function is made ineffective. More specifically, a description will be given of a case in which the control that makes the instruction refetch signal active is executed at the time of executing the program that requires the high security.

The process that requires the high security such as the encryption processing as the absolution condition is switched over so that the operation of the refetch of the instruction descried in the first embodiment is conducted in order to enhance the security, and the operation of not refetching the instruction is conducted in the case of conducting other processing.

Figure 7:
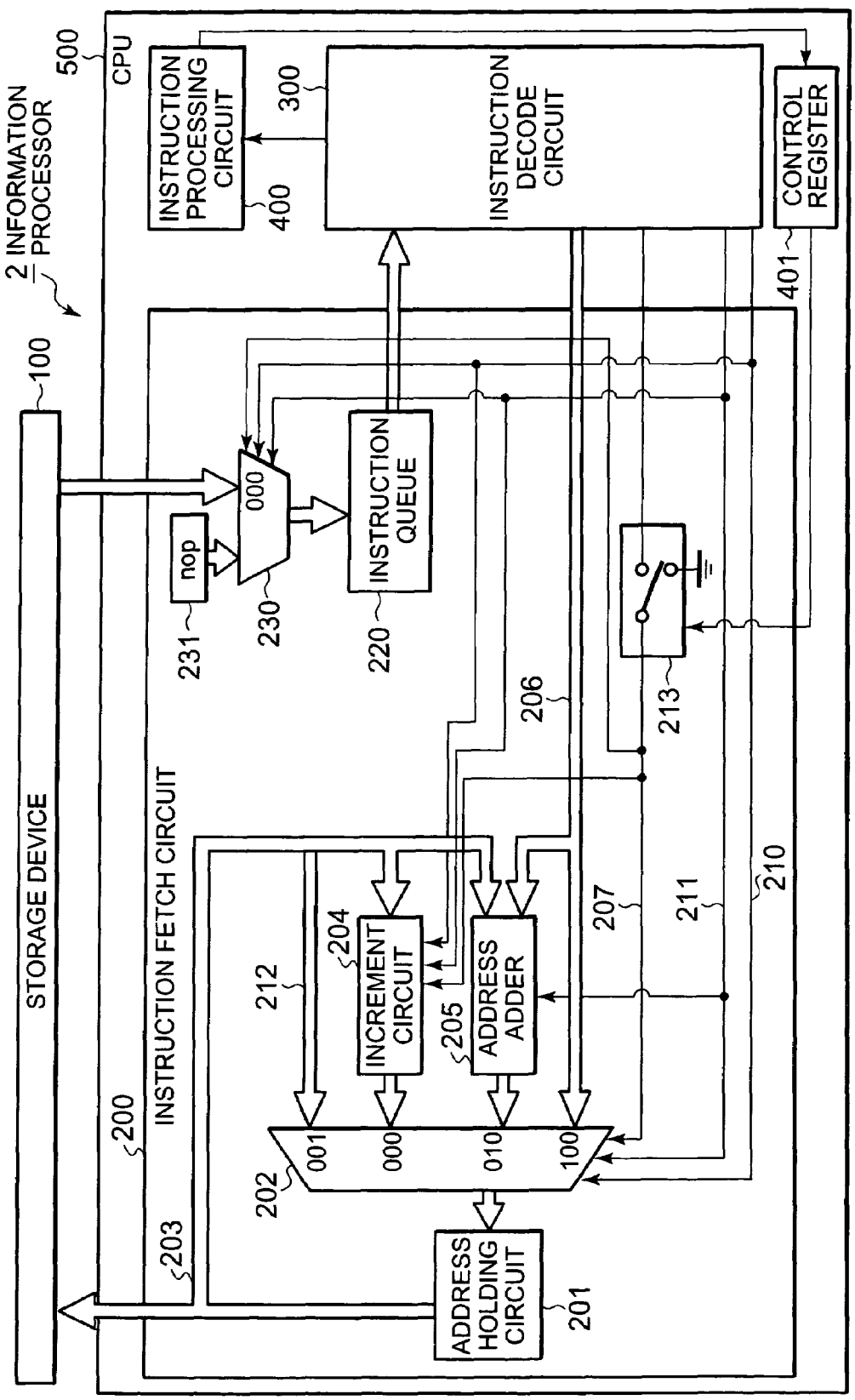
FIG. 7 is a block diagram showing an example of an information processor according to a second embodiment of the present invention.

FIG. 7 is a block diagram showing an example of an information processor according to the second embodiment of the present invention. An information processor 2 shown in FIG. 7 adds a switch 213 and a control register (control unit) 401 to the information processor 1 shown in FIG. 1.

The switch 213 is a switch that changes over whether the instruction refetch signal 207 is made active or not. The control register 401 holds a set value that changes over the switch 213. The switch 214 changes over on and off based on the set value that is held by the control register 401. When 1 is written in the control register, the switch 213 turns on, and the instruction refetch signal 207 is connected to the instruction decode circuit 300 to request the instruction refetch. On the other hand, when 0 is written in the control register, the switch 213 turns off, and the instruction refetch signal 207 is disconnected from the instruction decode circuit 300. In this case, a connection line to the address select circuit 202 is fixed to a GND level, the instruction refetch signal 207 is not made effective (active state), and the instruction refetch is not conducted. Therefore, the operation is identical with the conventional operation. The control register 401 is controlled by the CPU 500, and a set value (1 or 0) is written by the instruction processing circuit 400.

The switch 213 makes the instruction refetch function effective by only a critical processing (for example, an encryption processing portion) that really emphasizes the security, and other processing is controlled so as not to conduct the instruction refetch operation, thereby making it possible to suppress a decrease in the performance and an increase in the power consumption to the minimum. In the case where the instruction refetch function is made effective, the same operation as that in the first embodiment is conducted. On the other hand, in the case where the instruction refetch function is made invalid, the following operation is conducted.

In the case where the absolute branch instruction is detected by the instruction decode circuit 300, and also in the case where branch occurs, the absolute branch signal 210 indicating that branch is conducted is made active, and the address holding circuit 201 is updated by an address (absolute address) that is supplied by the branch address signal 206. The increment circuit 204 stops the increment operation in the case where any one of the absolute branch signal 210, the relative branch signal 211, and the instruction refetch signal 207 is made active by satisfying the branch condition. Also, in the case where the relative branch instruction is detected by the instruction decode circuit 300, and the branch occurs, the relative branch signal 211 indicative of branching is made active. The address holding circuit 201 adds the value (relative address) of the branch address signal 206 and the value of the present address signal 203 that is held by the address holding circuit 201 by the address adder 205, and is updated to the branched address. In this situation, the address adder 205 operates in the case where the relative branch signal 211 is made active, and in other cases, stops the operation in order to reduce the power consumption.

As described above, a value of the control register 401 is set based on the program to be executed, thereby making it possible to change over the effectivity or ineffectivity of the instruction refetch function. With the above operation, switching is made between a case where the security is emphasized and a case where other elements (for example, an improvement in the performance, suppression in the power consumption) other than the security are emphasized. As a result, it is possible to realize the execution mode along the intended purpose of program.

Third Embodiment

In a third embodiment, a description will be given of one aspect of an information processor that assumes a CPU having plural instruction queues so as to take in plural instructions at once. For example, a CPU having an instruction fixed to 16-bit length and a 32-bit bus can take in two instructions at the same time. In the case where plural instruction queues exist, the address at which the instruction to be presently executed is stored is shifted from the address to be presently fetched. For that reason, as in the information processor 1 of FIG. 1, in the operation of feeding back the address that is held by the address holding circuit 201 according to the feedback signal 212, the instruction refetch cannot be correctly conducted. Under the circumstances, when the instruction is stored in the instruction queue 220, the address is also stored in the instruction queue 220, which comes with the instruction. As a result, when refetch occurs, the information is used to enable the correct refetch.

Figure 8:
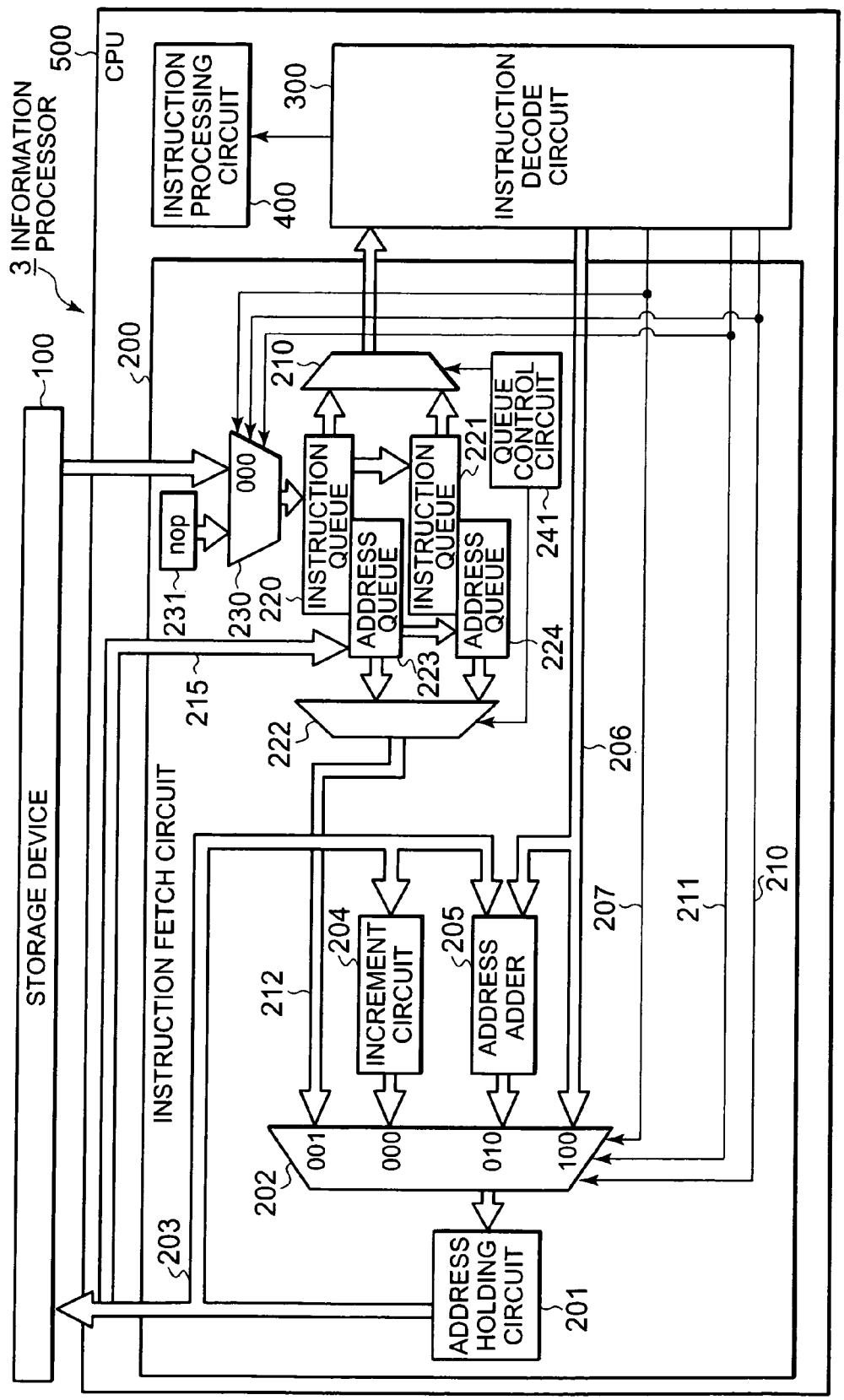
FIG. 8 is a block diagram showing an example of an information processor according to a third embodiment of the present invention.

FIG. 8 is a block diagram showing an example of an information processor according to the third embodiment of the present invention. In an information processor 3 shown in FIG. 8, an instruction queue 221, address queues 223, 224, and an address queue select circuit 222 are added to the information processor 1 shown in FIG. 1. A difference in the operation from the first embodiment will be described below.

The signal 212 that feeds back the address does not feed back the value held by the address holding circuit 201 as in the first embodiment, but supplies the address that is held by the address queue. When the instruction decode circuit 300 decodes the branch instruction, the instruction decode circuit 300 makes the refetch request signal 207 active, and supplies the address to the signal 212 from the address queue to execute the refetch. As a result, in the case of having plural instruction queues, the instruction fetch can be correctly reattempted even in the case where the address value that is held by the address holding circuit is shifted from the address at which refetch is to be conducted.

In the example of the information processor 1 shown in FIG. 8, two pairs of instruction queues and address queues are provided, respectively, and controlled by the queue control circuit 241. The queue control circuit 241 alternately uses the queue. For example, when the instruction and the address have been already stored in the instruction queue 220 and the address queue 223, the instruction and the address which come from the storage device are stored in the instruction queue 221 and the address queue 224. When the instructions are read from the instruction queue 220 and the address queue 223 and become empty, the instruction and the address are stored in the instruction queue 220 and the address 223, respectively. That is, the instruction and the address are stored as a set.

As described above, according to preferred embodiments of the present invention, the processing time is made equal to each other in the case where the condition is branched by the conditional branch instruction and in the case where the condition is not branched, thereby making it possible to make the processing timing at which the instruction is executed equal to each other. In addition, the operating circuits are made equal to each other, thereby making it possible to make the power consumption equal to each other. More specifically, in the case of detecting the conditional branch instruction, control is so made as to conduct the instruction fetch so that the timing at which the instruction is executed becomes equal to each other regardless of the presence or absence of the branch. Also, even in the case where the respective operating circuits are different between a case where branch is made and a case where no branch is made, all of the related circuits are operated, the necessary calculation results are selected, and the unnecessary calculation result is dealt with as the dummy operation (the operation result is discarded), thereby making it possible to make the power consumption equal to each other. As a result, the side channel information such as the shift of the instruction execution timing or the difference in the power consumption which is caused by the branch is eliminated. Accordingly, when the encryption algorithm or the like is implemented in the computer, regardless of the presence or absence of the branch in the branch instruction, it is possible to make the processing time equal to each other (timing attack countermeasure), and make the power consumption equal to each other (SPA/DPA countermeasure) Also, it is possible to avoid the side channel attack, and protect the secret information within the device.

The CPU described in the respective embodiments as the internal CPU can be incorporated into the microcomputer that is a semiconductor device. Also, the storage device and the CPU described in the above respective embodiments may be built in the microcomputer of one chip, and also the chip of the storage device and the CPU chip may be connected to each other within one semiconductor package to constitute the semiconductor device.

It is apparent that the present invention is not limited to the above embodiments, but may be modified and changed without departing from the scope and spirit of the invention.

Further, it is noted that, Applicant's intent is to encompass equivalents of all claim elements, even if amended later during prosecution.

What is claimed is:

1. An information processor, comprising:
    an instruction fetch unit that fetches an instruction code to be executed to output a fetched instruction code; and
    an instruction decode unit that decodes the fetched instruction code,
    wherein the instruction decode unit outputs, upon a detection of the instruction code being a conditional branch instruction which has a predetermined condition, a control signal to the instruction fetch unit so that a timing of fetching a first successive instruction code which is yet to be fetched in response to the predetermined condition being satisfied becomes identical with a timing of fetching a second successive instruction code which is yet to be fetched in response to the predetermined condition being unsatisfied.

2. An information processor according to claim 1, wherein: when the predetermined condition is not branched based on the conditional branch instruction, the instruction decode unit generates an instruction refetch signal that instructs that the instruction code that has been already fetched is again fetched, and outputs the instruction refetch signal to the instruction fetch unit; and
    the instruction fetch unit again fetches a same instruction code based on the instruction refetch signal.

3. An information processor according to claim 2, further comprising a storage device that stores the instruction code in association with an address,
    wherein the instruction fetch unit includes an address holding unit that holds the address associated with the instruction code as a fetch address, fetches the instruction code that is output from the storage device based on the fetch address, and, in a case where the instruction refetch signal is input, allows the address holding unit to again hold a previous fetch address that is the fetch address from which the instruction code has been fetched to fetch the same instruction code.

4. An information processor according to claim 3, wherein:
    the instruction fetch unit further comprises an address select unit that receives a plurality of candidate addresses for fetching an instruction code including the fetch address that is held by the address holding unit as the previous fetch address, and in the case where the instruction refetch signal is input from the instruction decode unit, selects the previous fetch address from the plurality of candidate addresses as the fetch address to output the fetch address to the address holding unit; and
    the address holding unit again holds the previous fetch address that is selected by the address select unit.

5. An information processor according to claim 4, wherein the address select unit receives, as the plurality of the candidate addresses, an address of a subsequent instruction that calculates an address of an instruction to be executed subsequent to the fetch address, a relative address that is relatively branched, and an absolute address that is absolutely branched in addition to the previous fetch address, and selects one address from the plurality of candidate addresses.

6. An information processor according to claim 2, wherein the instruction fetch unit further comprises a control register that designates whether the instruction fetch unit fetches an instruction based on the instruction refetch signal output from the instruction decode unit.

7. An information processor according to claim 4, wherein:
    the instruction fetch unit further comprises a control register that designates whether an instruction is fetched based on the instruction refetch signal which is output from the instruction decode unit; and
    the address select unit changes over whether the previous fetch address is selected based on instruction contents of the control register.

8. An information processor according to claim 4 wherein the instruction fetch unit further comprises a plurality of address holding circuits that hold a plurality of addresses corresponding to a plurality of fetched instruction codes and output the held addresses to the address select unit as fetch addresses of successive instructions.

9. An information processor according to claim 1, further comprising an instruction processing unit that executes the instruction code decoded by the instruction decode unit, wherein:
    the instruction fetch unit, the instruction decode unit, and the instruction processing unit conduct a pipeline operation that executes a plurality of instructions in parallel; and
    when the instruction decode unit detects that the instruction code is a conditional branch instruction, the instruction decode unit conducts the pipeline operation so that the fetch timing of the instruction fetch unit, the decode timing of the instruction decode unit, and the execution timing of the instruction processing unit are aligned with respect to a first successive instruction code and a second successive instruction code regardless of a presence or an absence of a branch due to the branch condition.

10. An information processor according to claim 1, wherein the instruction fetch unit comprises:
    an address select unit configured to select and output the fetched instruction code; and
    an address holding unit configured to output a feedback signal and a previous fetch address to the address select unit.

11. An information processor according to claim 10, wherein the instruction fetch unit further comprises:
  an address increment unit configured to calculate an address of a subsequent instruction and to deliver the calculated address of the subsequent instruction to the address select unit; and
  an address adder unit configured to calculate a relative address and to deliver the calculated relative address to the address select unit.

12. An information processor according to claim 11, wherein the address increment unit and the address adder unit conduct a dummy operation in each of a normal instruction fetch and a branch instruction fetch.

13. An information processor according to claim 11, wherein the address select unit inputs the previous fetch address that has been held in the address holding unit from the feedback signal, the subsequent address of an instruction that is executed subsequently after a calculation of the address increment unit, the relative address that is relatively branched which has been calculated by the address adder unit, and an absolute address that is absolutely branched from a branch address signal.

14. An information processor according to claim 10, wherein the feedback signal comprises a value of the present address holding unit and an instruction refresh signal that instructs a fetching of a same instruction code.

15. A computer implemented method of executing a conditional branch instruction, said conditional branch instruction including a first instruction code which is yet to be fetched if a branch condition is satisfied, and a second instruction code which is yet to be fetched if the branch condition is denied, the method comprising:
  detecting whether or not the branch condition is satisfied or denied;
  calculating a first instruction code address when the branch condition is satisfied or a second instruction code address when the branch condition is denied;
  executing one of the first instruction code and the second instruction code in response to the branch condition;
  calculating a third instruction code address irrespective of the branch condition;
  executing the third instruction,
  wherein a timing of the third instruction code is made identical with a timing of the executed one of the first instruction code and the second instruction code.

16. The method according to claim 15, further comprising:
  fetching the first instruction code or the second instruction code in response to the branch condition after calculating the codes;
  decoding the first instruction code or the second instruction code in response to the branch condition.

17. The method according to claim 15, wherein the fetching of the instruction codes, the decoding of the instruction code, and the execution of the instruction code are processed in a pipeline operation.

18. A computer implemented method of executing a branch instruction, the method comprising:
  detecting whether or not a branch is taken in response to a conditional branch instruction code;
  calculating a branch destination address when the branch is detected to be taken;
  fetching a first instruction code at the branch destination address;
  fetching a second instruction code next to the conditional branch instruction when the branch is detected not to be taken; and
  inserting a conditional branch instruction when the branch is detected as not to be taken so that a timing of fetching an instruction code when the branch is detected as not to be taken becomes identical with a timing of fetching an instruction code when the branch is detected as to be taken before fetching the second instruction code.

* * * * *